March 13, 1956  A. C. WINTEMBERG  2,737,904
RAILWAY MOTOR TRUCK
Filed Jan. 7, 1952  2 Sheets-Sheet 1

March 13, 1956 — A. C. WINTEMBERG — 2,737,904
RAILWAY MOTOR TRUCK

Filed Jan. 7, 1952 — 2 Sheets-Sheet 2

Inventor
Adelbert C. Wintemberg
By Rodney Bedell
atty.

United States Patent Office 2,737,904
Patented Mar. 13, 1956

2,737,904

RAILWAY MOTOR TRUCK

Adelbert C. Wintemberg, Drexel Hill, Pa., assignor to General Steel Castings Corporation, Granite City, Ill., a corporation of Delaware Application January 7, 1952, Serial No. 265,219

7 Claims. (Cl. 105—59)

The invention relates to railway rolling stock six wheel trucks in which each wheel and axle assembly is provided with an individual motor and gearing unit supported in part from the associated axle and in part from the truck frame.

Such motor trucks may have their motors supplied with cooling air transmitted from compressors in the vehicle body through conduits or boots of flexible material leading directly downwardly from the vehicle body and between the truck frame and bolster to the motors. This is not a satisfactory arrangement when the truck includes a lateral motion bolster for mounting the vehicle body, because the space between the truck bolster and the truck frame side member is limited, and because the swiveling of the truck relative to the body on curved track results in substantial lateral movement between the ends of the conduits and the motors on the end axles. The problem of providing sufficient space for the conduit in such a truck is made more difficult by attempts to minimize the heighth of the vehicle underframe above the rail and by the presence of brake hanger brackets and other brake equipment on the truck adjacent to the conduits.

The main object of the present invention is to provide for an adequate supply of air from the vehicle body to all three motors of a six wheel truck having a lateral motion bolster for supporting the vehicle body and, more particularly, to reduce the length and number of long flexible boots in the restricted space between the body, truck bolster, truck frame and equipment mounted on the truck.

Another object is to minimize the height of the vehicle body from the rail when mounted on a six wheel lateral motion truck.

These objects are obtained by supporting a portion of the vehicle body weight upon a center plate offset from the middle axle of the truck and a portion of the body weight upon bearings spaced longitudinally from the middle axle of the truck and spaced apart transversely of the truck and by passing air from the vehicle body into the truck bolster at points spaced from the center plate and using the truck bolster and truck frame as conduits for air to all the motors.

In the accompanying drawings illustrating the invention,

Figure 4 also showing a portion of the vehicle underframe and the air conduit to the truck bolster.

Figure 5 is a top view of the truck bolster and is drawn to a smaller scale than the other figures.

Figure 1:
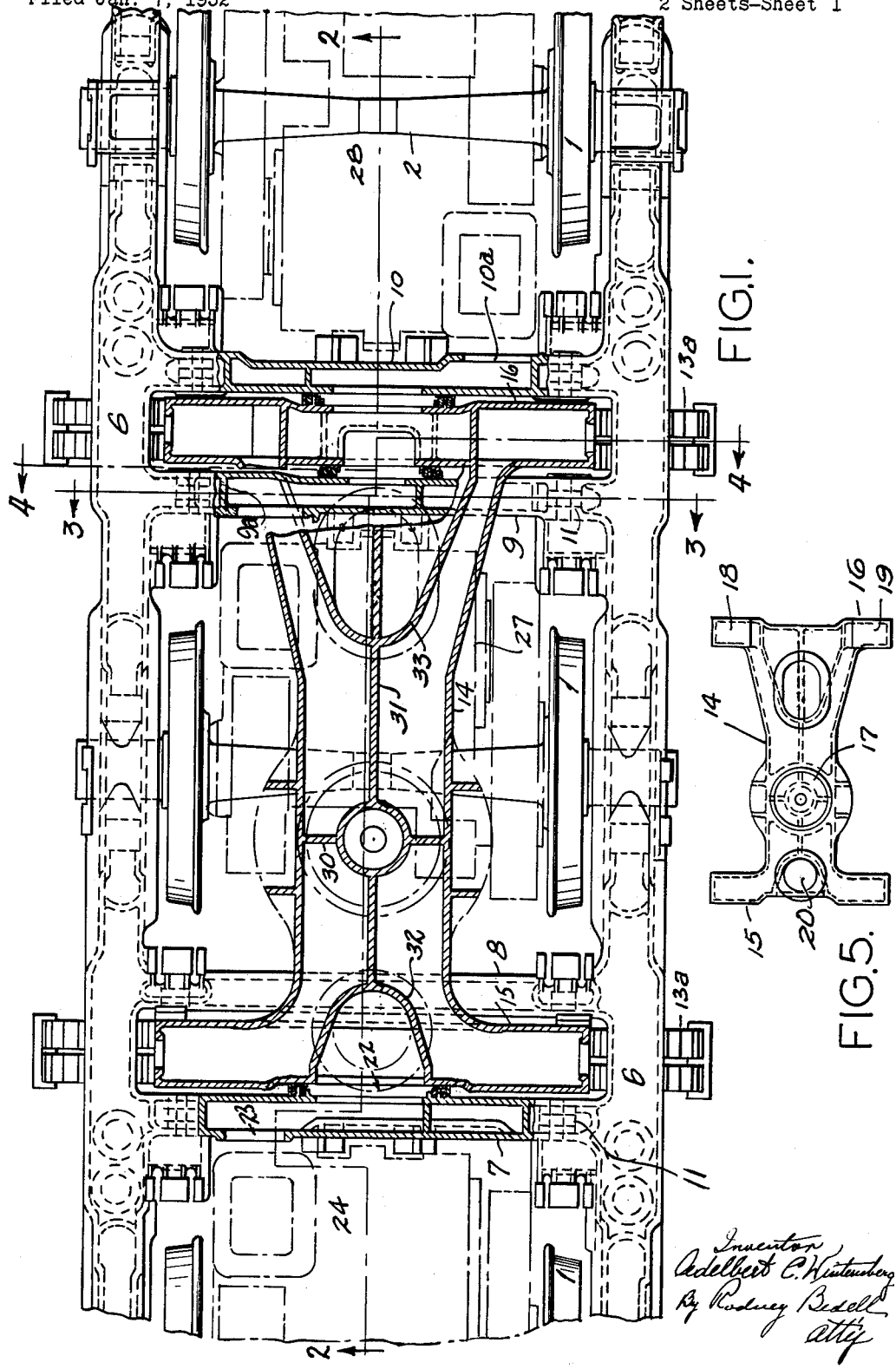
Figure 1 is in part a top view of the major portions of a six wheel motor truck and in part a longitudinal section on line 1—1 of Figure 2. Conduits for air from the body to the truck are shown also.
Figure 2:
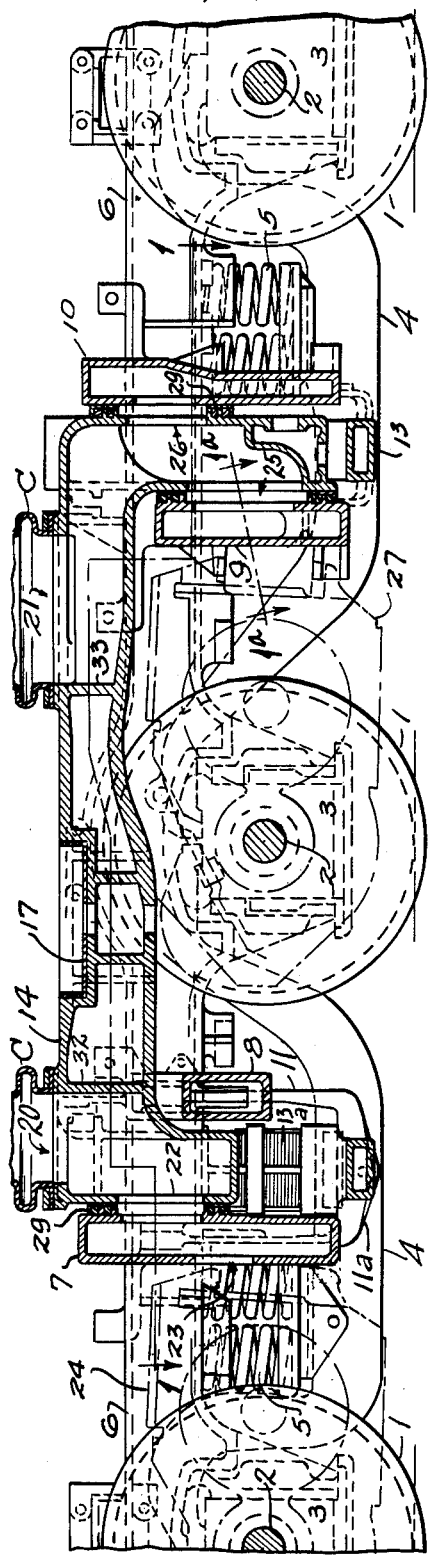
Figure 2 is the longitudinal vertical section taken approximately on the line 2—2 of Figure 1.
Figure 3:
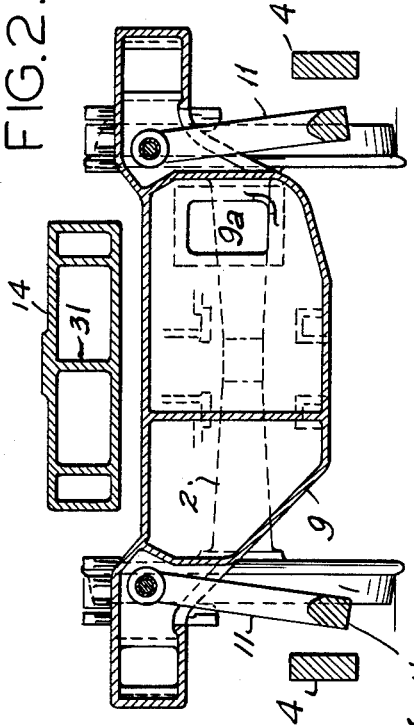
Figures 3 and 4 are vertical transverse sections taken on the corresponding section lines of Figure 1.
Figure 4:
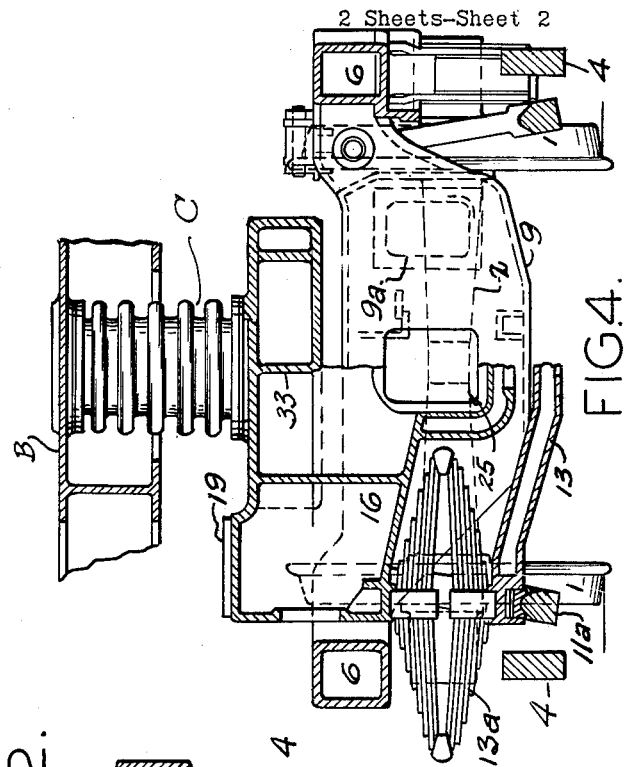

The truck includes the usual wheels 1, axles 2, journal boxes 3 mounted thereon, and drop equalizers 4 carried on the journal boxes. Equalizer springs 5 support the truck frame which includes wheel pieces 6 at each side of the truck and transverse transoms 7, 8, 9, 10 arranged in pairs, one pair 7, 8 being disposed between the middle wheel and axle assembly and the left-hand wheel and axle assembly and the other pair of transoms 9, 10 being disposed between the middle wheel and axle assembly and the other end wheel and axle assembly. Preferably, wheel pieces 6 and transoms 7, 8, 9, 10 comprise a single casting and are of hollow box section.

Suspended from the ends of the transoms are swing hangers 11 having cross bars 11a which support the ends of spring planks 13 extending transversely of the truck intermediate the transoms and mounting the bolster springs 13a. The bolster is H-shaped in plan and includes a longitudinal central member 14 and transverse cross arm members 15, 16. The bolster members are substantially box shape in cross section. Longitudinal member 14 is provided with a center plate bearing 17 and transverse arm 16 is provided with transversely spaced bearings 18 and 19. Bearings 17, 18 and 19 are so positioned and the weight of the vehicle body B is so distributed to them that the longitudinal member of the bolster may be made shallow enough to clear the motor on the middle wheel and axle assembly and at the same time maintain a low height from rail to the center plate bearings and side bearings.

Air is delivered from a compressor on the vehicle body (not shown) through inlets 20 and 21 in the bolster longitudinal center member at opposite sides of center plate 17, longitudinally of the truck, and then to cross arms 15 and 16. Air is conducted from cross arm 15 to an outlet 22 leading into transom 7, having an outlet 23 leading to the end of the adjacent motor housing 24. Air is conducted from cross arm 16 to outlet 25 leading into transom 9 and to outlet 26 leading into transom 10. Transom 9 discharges at 9a into the end of the housing 27 for the middle motor and gearing, and transom 10 discharges at 10a into housing 28 for the right hand motor.

Conduit C from the vehicle body B to inlets 20 and 21 are of a flexible material and readily accommodate the relative movement of the truck bolster and body B due to swiveling of the truck on curved track. The truck bolster and body B may move as a unit transversely of the truck frame and such movement does not distort conduit C. The relative movements of the truck bolster and truck frame, due to the action of the bolster swing hangers 11 and springs 13a, result in shifting of the aligned openings between the cross arms and adjacent transoms. These openings are effectively sealed by combination packing and wear units indicated at 29.

The bolster member 14 is relatively shallow from end to end and extends over the middle motor housing and over adjacent transoms 8 and 9 which are depressed intermediate their ends to accommodate the bolster center member. Cross arms 15 and 16 are relatively deep, arm 16 extending substantially to the level of the bottoms of the frame transoms.

Bolster center member 14 is provided with upright webs 30, 31, 32 and 33, which reinforce the member to provide adequate support for its load. Webs 32 and 33 also segregate the air streams so that predetermined quantities of air are led through the outlet in the middle of transom 7 and to the outlets in opposite ends of transoms 9 and 10.

By using end-blown motors intead of top-blown motors and leading the air directly from the transoms to the motor housings through seals 29, the use of boots leading from body B directly to the motor housing is avoided. The relatively short conduit C leading from the vehicle body to inlets 20 and 21 in the bolster are so close to center plate 17 that they are only slightly distorted when the truck swivels on curved track. These conduits are not distorted at all by lateral movement of the vehicle body and truck bolster relative to the truck frame. The box section structure of the bolster and transoms not only affords air conduits but provides maximum strength for a given amount of material and results in rigid, strong truck structure without increasing the truck wheel base or the height of the center plate above the rail. Swiveling of the truck about the center plate does not affect the conduits through the truck bolster cross arms and truck frame transoms. Lateral movements of the truck bolster relative to the truck frame shifts the opposed openings in the cross arms and transoms without diminishing the areas of the openings or otherwise affecting the continuous flow of air to the motors.

The structure improves the conditions surrounding the transmission of air from the vehicle body to the motors and attains the objects set forth in the introductory portion of this specification. The details of the structure may be varied without departing from the spirit of the invention, and the exclusive use of modifications coming within the scope of the claims is contemplated.

What is claimed is:

1. In a railway truck, three weel and axle assemblies, a truck frame mounted thereon and having wheel pieces and transoms connecting said wheel pieces, there being at least one transom between the middle assembly and each end assembly, a motor operatively associated with each assembly, each motor including a housing supported in part on the corresponding assembly and in part upon the adjacent transom, a bolster movable relative to the truck frame and comprising a central longitudinal member and spaced cross members at the ends of said longitudinal member and adjacent to said transoms, there being a body supporting center plate bearing on said longitudinal member, said bolster members and transoms being hollow and partitioned to form separate air conduits leading through the upper wall of the longitudinal member at points at opposite sides of said center plate bearing longitudinally of the truck to the cross members and through the side walls of the latter to the transoms and through the latter to each of said motor housings.

2. In a railway truck, three wheel and axle assemblies, a truck frame mounted thereon and having wheel pieces and transoms connecting said wheel pieces, there being a pair of spaced transoms between the middle assembly and each end assembly, a motor operatively associated with each assembly, each motor including a housing supported in part on the corresponding assembly and in part upon an adjacent transom, a bolster spring-supported on the truck frame and comprising a central longitudinal member and a cross member at each end of said longitudinal member positioned between a pair of said transoms, there being a body supporting center plate bearing on said longitudinal member and body supporting bearings on one of said cross members spaced longitudinally of the truck from said center plate bearing and from the longitudinal center line of the bolster, said bolster members being hollow and partitioned to form separate air conduits leading through the upper wall of the longitudinal member, at opposite sides of said center plate bearing, to said cross members and through the side walls of the latter to the ends of all the motor housings supported from said transoms.

3. In a railway truck, three wheel and axle assemblies, a truck frame mounted thereon and having wheel pieces and a pair of spaced transoms between the middle assembly and each end assembly, the transom of each pair nearest the middle assembly being depressed between the wheel pieces, a motor operatively associated with each assembly, each motor including a housing supported in part on the corresponding assembly and in part upon an adjacent transom, a bolster comprising a central longitudinal member extending over said depressed transoms and having a cross member at each end extending downwardly to a position between said transoms, said members being hollow, the pair of transoms at one end of the bolster and the outer transom at the other end of the bolster all being hollow, there being air inlets in the top wall of the bolster longitudinal member and there being air passages through both side walls of the cross member, between the pair of hollow transoms, into those transoms, and there being an air passage from the other cross member into the adjacent outer transom, there being aligned openings in each housing and in the adjacent transom wall for the passage of air from the interior of the transom to the motor.

4. A railway truck bolster comprising a central longitudinal member and downwardly extending cross members at the ends thereof, said longitudinal member having a body supporting center plate bearing positioned between said cross members, and having body supporting bearings spaced longitudinally of the truck from the center plate bearing and spaced from the longitudinal center line of the bolster on one of said cross members, said bolster members being hollow to form air conduits, there being entrances to the longitudinal member at points at opposite sides of said center plate bearing longitudinally of the bolster, there being an air outlet in each of said cross members intermediate its ends and downwardly of said longitudinal member, the width of the outlet in the cross member with spaced bearings being substantially less than the distance between the bearings, and vertical webs in said cross member beneath said bearings and extending substantially throughout the width and depth of said cross member reinforcing the latter and forming end walls of the air conduit in that cross member.

5. A railway truck bolster comprising a longitudinal member and cross members at the ends thereof, said members being of box-like cross section and the cross members being narrow and deep relative to the longitudinal member, a body supporting center bearing on said longitudinal member intermediate said cross members and braced by webs extending throughout the width and heighth of the longitudinal member, a body supporting bearing near each end of one of said cross members, each braced by a transverse web beneath the bearing and extending throughout the width and heighth of the cross member, air inlets through the top of the longitudinal member at each side of the center plate bearing longitudinally of the bolster, and air outlets in the side walls of said cross member intermediate the bearings thereon and below the level of said longitudinal member, said webs and the walls of said members forming air conduits of substantially constant cross sectional area between said inlets and outlets.

6. In a railway truck, three wheel and axle assemblies, a truck frame mounted thereon and having wheel pieces and transoms connecting said wheel pieces, there being a pair of motor supporting spaced transoms between the middle assembly and at least one end assembly, there being at least one motor supporting transom between the middle assembly and the other end assembly, a motor operatively associated with each assembly, each motor including a housing supported in part on the corresponding assembly and in part upon an adjacent transom, a bolster movable laterally of the truck relative to the truck frame and having a portion at one end extending between said pair of spaced motor supporting transoms and a portion at the other end located adjacent another motor supporting transom, the bolster having a body supporting center plate bearing and having hollow portions forming air conduits leading through the upper wall of the bolster, at opposite sides of the center plate bearing, to said bolster end portions and through the side walls of said end portions to the adjacent motor supporting transoms and through the latter to the adjacent motor housings.

7. A railway truck as described in claim 6 wherein one end portion of the bolster extends downwardly, in a direction toward the bottom of the frame, between the pair of spaced transoms, and one of said air conduits progresses downwardly into said downwardly extending end portion of the bolster and leads through the side walls of said portion below the level of the conduit portions adjacent the center plate bearing.

References Cited in the file of this patent

UNITED STATES PATENTS

| | | |
|---|---|---|
| 880,477 | Brinckerhoff | Feb. 25, 1908 |
| 1,717,058 | Miller | June 11, 1929 |
| 1,895,500 | Todd | Jan. 31, 1933 |
| 2,164,444 | Blomberg | July 4, 1939 |
| 2,258,656 | McCormick | Oct. 14, 1941 |
| 2,463,255 | Elliot | Mar. 1, 1949 |